United States Patent
Rader et al.

(10) Patent No.: US 7,062,369 B2
(45) Date of Patent: Jun. 13, 2006

(54) METHOD AND DEVICE FOR DETERMINATION OF A WHEEL BRAKE PARAMETER

(75) Inventors: Thomas Rader, Reutlingen (DE); Thomas Glasstetter, Oberderdingen (DE)

(73) Assignee: Robert Bosch GmbH, Stuttgart (DE)

( * ) Notice: Subject to any disclaimer, the term of this patent is extended or adjusted under 35 U.S.C. 154(b) by 98 days.

(21) Appl. No.: 10/221,089

(22) PCT Filed: Jan. 31, 2001

(86) PCT No.: PCT/DE01/00357

§ 371 (c)(1),
(2), (4) Date: Apr. 22, 2003

(87) PCT Pub. No.: WO01/66393

PCT Pub. Date: Sep. 13, 2001

(65) Prior Publication Data

US 2003/0163236 A1    Aug. 28, 2003

(30) Foreign Application Priority Data

Mar. 8, 2000   (DE) ................................ 100 11 270

(51) Int. Cl.
  *G06F 19/00* (2006.01)
  *B60L 7/10* (2006.01)
(52) U.S. Cl. ....................... 701/79; 180/65.2; 180/65.1; 318/801

(58) Field of Classification Search ............ 701/70–74; 180/65.2, 65.1; 318/801
See application file for complete search history.

(56) References Cited

U.S. PATENT DOCUMENTS 5,312,170 A    5/1994   Erban et al.

FOREIGN PATENT DOCUMENTS

| DE | 39 09 588 |   | 9/1990 |
|----|-----------|---|--------|
| DE | 3909588 A | * | 9/1990 |
| DE | 196 48 936 |  | 5/1998 |

OTHER PUBLICATIONS

Anton van Zanten, Reiner Erhardt, Georg Pfaff, "VDC—the Vehicle Dynamics Control System of Bosch", SAE paper 950759.

* cited by examiner

*Primary Examiner*—Jack Keith
*Assistant Examiner*—Ronnie Mancho
(74) *Attorney, Agent, or Firm*—Kenyon & Kenyon LLP

(57) ABSTRACT

A method and a device for determining a characteristic value of a wheel brake are described. The characteristic value here is the brake characteristic value, which representing the relationship between the braking torque or braking force and the brake pressure of a wheel brake operated hydraulically. This brake characteristic value is determined individually for each wheel by calculations based on wheel-specific variables.

15 Claims, 3 Drawing Sheets

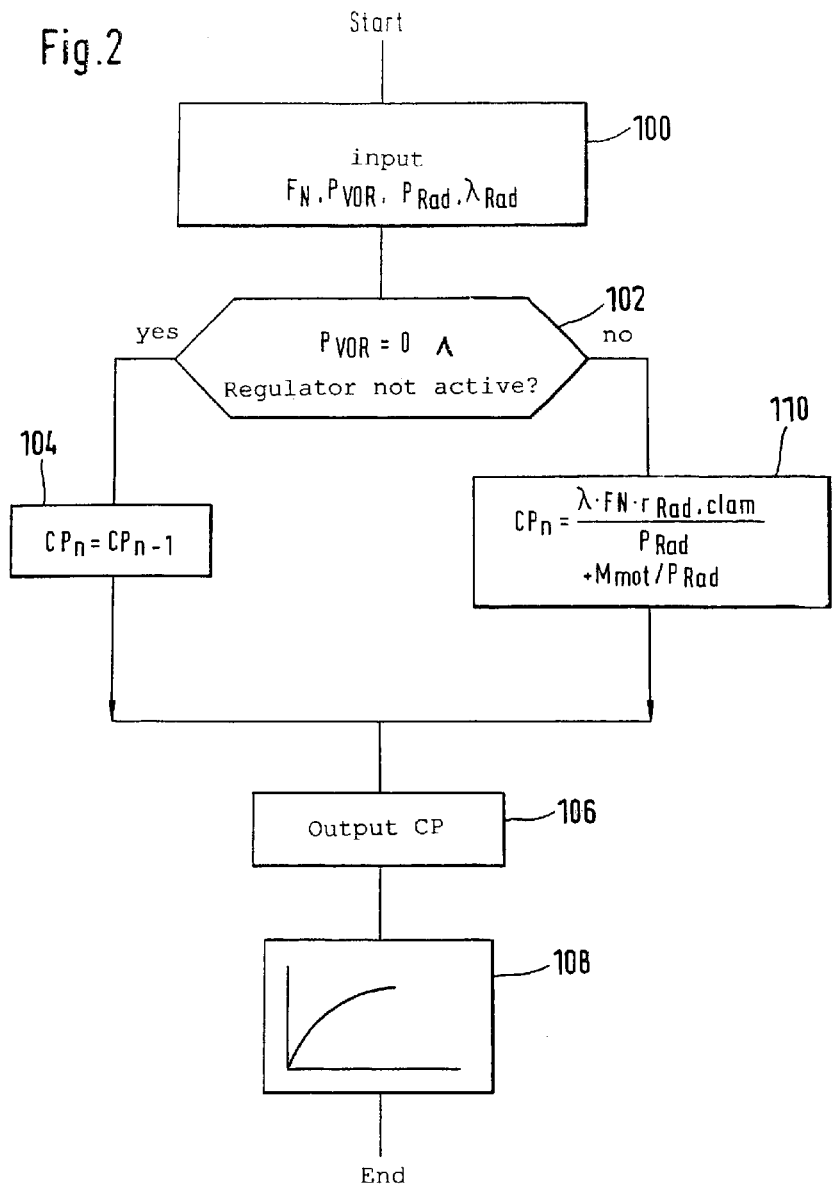

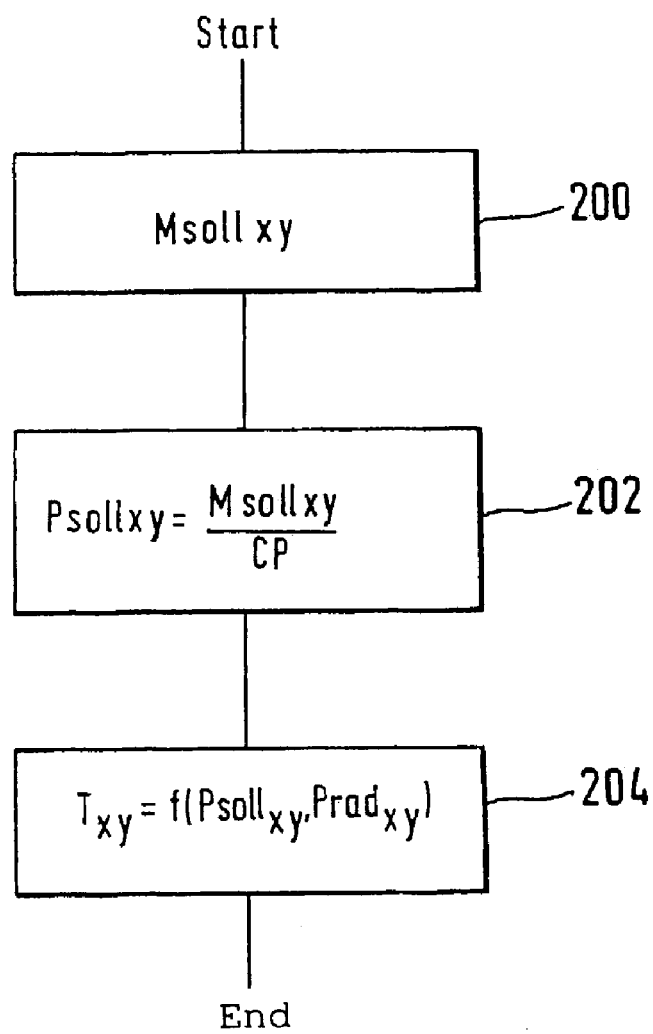

METHOD AND DEVICE FOR DETERMINATION OF A WHEEL BRAKE PARAMETER

BACKGROUND INFORMATION

The present invention relates to a method and a device for determining a characteristic value of a wheel brake.

In modern control systems for brake systems, brake-specific characteristic values are often used. One essential characteristic value is the proportionality constant between the braking torque exerted on the wheel brake, i.e., the braking force applied, and the braking pressure established. This variable is used, for example, with the known vehicle dynamics control systems. Such a control system is described in the publication, SAE paper 950759 "VDC—the Vehicle Dynamics Control System of Bosch" by Anton van Zanten, Reiner Erhardt and Georg Pfaff. The setpoint braking torques for a wheel determined by the control system described there are converted into setpoint pressure values by using a proportionality factor CP, where proportionality factor CP describes the brake-specific correlation between the braking torque and the brake pressure. Furthermore, the brake characteristic values are also used in the hydraulic model to determine the brake pressures from the control signals for the valves, so that the characteristic values have an effect on the accuracy of the control. The characteristic values play a role in determination of the wheel performance (e.g., in methods of calculating slip, etc.) and variables derived therefrom.

The same thing also applies to electrically controlled brake systems in which the braking force applied to the wheel, i.e., the braking torque, is adjusted by an electronic regulator as a function of the degree of operation of an operating element, in particular a brake pedal, operable by the driver. One example of this is German Patent Application 196 48 936 A1, where the brake characteristic values are also analyzed in controlling the wheel brakes.

It has been found that the brake characteristic values of wheel brakes are not constant but instead vary as a function of temperature, the age of the brakes, and the condition of the brake disk. The reason for the change is that these circumstances result in a change in the coefficient of friction between the brake shoe and the brake disk or drum and thus influence the relationship between the brake pressure and the braking force applied, i.e., the braking torque. If brake characteristic values were assumed to be constant, this would result in inaccuracies, which are unwanted in some applications, in the calculations using these characteristic values or it would result in an incorrect appraisal of wheel performance.

Therefore, German Patent Application 196 48 936 A1 cited above describes a procedure with the help of which the brake characteristic value and/or values are adapted to the changes. On the basis of the equilibrium of forces of the vehicle in the longitudinal direction, a correlation is derived there according to which the prevailing brake characteristic value is determined on the basis of the brake pressure and the deceleration of the vehicle. With the method proposed there, the brake characteristic values may be determined only for an axle.

ADVANTAGES OF THE INVENTION

The determination of the brake characteristic value as a function of wheel slip and additional wheel-specific variables provides an adaptation of the brake parameter, with the help of which continuous adaptation to the respective driving situation and to ambient influences is possible. This permits a more accurate evaluation of wheel performance and improves the quality of the estimation of the brake pressure, in addition to improving the regulation and/or control.

It is especially advantageous that the brake parameter is determined for each wheel only on the basis of wheel-specific variables. Therefore wheel-specific change are determined, resulting in a further improvement in the accuracy of the control.

Additional advantages are derived from the following description and the dependent patent claims.

DRAWING

The present invention is explained in greater detail below on the basis of the embodiments illustrated in the drawing.

FIGS. 2 and 3 show flow charts illustrating a preferred embodiment for determination and analysis of the brake parameter.

DESCRIPTION OF THE EXEMPLARY EMBODIMENTS

Figure 1:
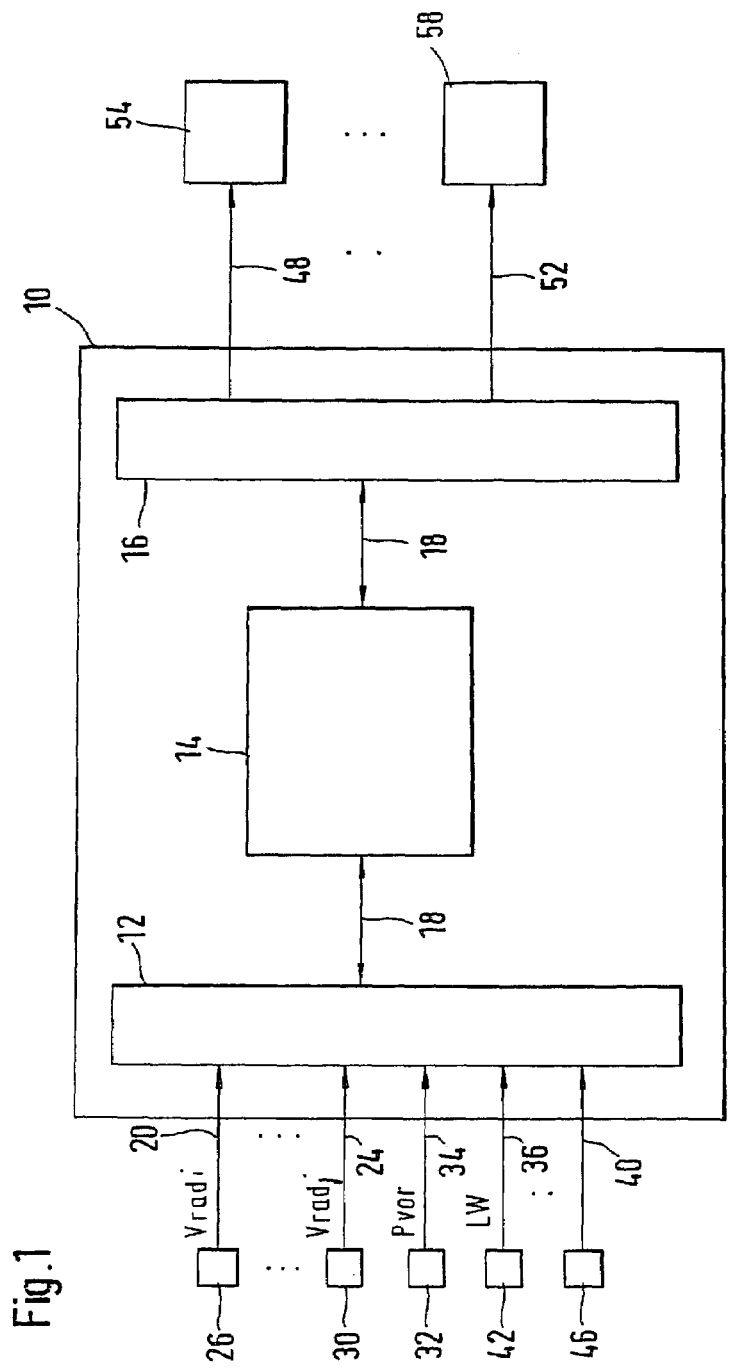
FIG. 1 shows a schematic block diagram of a control device for controlling the brake system of a motor vehicle.

FIG. 1 shows a control unit, which includes at least one input circuit 12, a microcomputer 14, and an output circuit 16. These are interconnected via a communication system 18 for mutual exchange of information and data. Input lines lead to input circuit 12 so that signals which represent the operating variables or from which the operating variables are derivable are sent to control unit 10. FIG. 1 shows as an example input lines 20 through 24, which carry signals representing wheel speeds VRAD of the wheels of the vehicle, from measuring devices 26 through 30. Furthermore, a variable representing the admission pressure in the brake system is sent from a measuring device 32 over an input line 34; the admission pressure is the pressure established in the brake system by the driver by operating the brake pedal. Furthermore, input lines 36 through 40 are provided so that additional variables, which are of interest in conjunction with the control functions executed by control unit 10, are sent from measuring devices 42 through 46. Such variables are mentioned in the related art cited in the preamble, for example, and may include the steering angle, yaw rate, transverse acceleration, etc. Output lines 48 through 52 lead from output circuit 16 to valve and/or pump arrangements 54 through 58, which are assigned to the individual wheel brakes. As part of the control functions it executes, control unit 10 triggers the valve and/or pump arrangements to influence the brake pressure in the respective wheel brakes as specified according to the control function.

Examples of the control functions executed by control unit 10 through programs implemented in microcomputer 14 are known from the related art cited in the preamble. In the case of braking force and/or braking torque calculations based on the brake pressure determined and conversely, the brake characteristic values of the individual wheel brakes are analyzed when converting setpoint torque values or setpoint force values to brake pressure setpoint values and/or in calculations of the estimate of wheel performance. These factors are determined by the design of each brake and are composed of the effective contact areas of the brake shoes on the brake disks, the distance from the center of each brake shoe to the brake disk, the distance from the center of each brake shoe to the center of the wheel, and the coefficient of friction between each brake shoe and the brake disk. These variables are not usually available and/or they are subject to changes. If typical values for the brake characteristic value are assumed as constant, the accuracy of calculations performed on the basis of this brake characteristic value is not adequate for some applications. It has been found that during phases in which the pressure in the wheel brake is known, it is possible to estimate the coefficient of friction on the brake and thus to estimate the brake parameter. The pressure in the wheel brake is known when it measured directly or when the driver brakes without regulating intervention. In this case, the wheel brake pressure is equal to the measured admission pressure, because the pressure values input by the driver into the hydraulic brake system are transmitted to the wheel brakes without any influence. If this is the case, then the brake characteristic value may be determined individually for each wheel as a function of wheel-specific variables. The following formula has proven suitable:

$$CP=(\lambda * FN * RRAD * CLAM)/PRAD + MMOT/PRAD$$

where $\lambda$ denotes the wheel slip, FN is the tire contact force, which may be measured or estimated, for example, PRAD is the dynamic wheel radius, which may be assumed to be constant, CLAM is the proportionality factor between the slip and the coefficient of friction, which may also be assumed to be constant, PRAD is the wheel brake pressure, which in the present operating state corresponds to the measured admission pressure, and MMOT is the driving torque of the engine, which is transferred to the wheel in question. For a non-driven wheel, the additive term is therefore eliminated without a replacement.

If a condition prevails under which the brake characteristic value may be estimated while braking, the individual brake characteristic values are calculated according to the formula given above. To counteract interference with the signals used, the calculated value is then also low-pass filtered using a very large time constant. This eliminates extreme values in the adaptation.

If the operating state as described above is not available for adaptation of the brake characteristic value, the previously calculated value is retained.

The above formula is derived on the basis of the equilibrium of torques on the wheel. In another embodiment, an equation derived from the equilibrium of forces is used. These equations differ only by a brake-specific constant.

In the preferred embodiment, the procedure described above is implemented as a program in microcomputer 14 of control unit 10. Such a program is diagramed in FIG. 2 on the basis of a flow chart.

After starting the program part, the required variables are input for each wheel in a first step 100, i.e., wheel slip $\lambda$RADi, admission pressure PVOR, tire contact force Fni and, if available, brake pressure PRADi (measured, or calculated by using the hydraulic model). Then in step 102, a check is performed to determine whether the admission pressure is 0, i.e., the driver is not braking and a regulator which might be present is not active, i.e., no braking intervention is being implemented. If this is the case, then according to step 104, previous brake characteristic value CP(n−1) is retained. Then in step 106, the brake characteristic value thus determined is filtered through a low-pass filter and output in step 108. This program is repeated in the next interval. If step 102 has shown that a braking operation is underway, then in step 110, brake characteristic value CP(n) is calculated on the basis of the formula given above. This is followed by step 106.

In the diagram according to FIG. 2, the wheel brake pressure is known. If this is not the case, then step 110 is initiated only when the admission pressure is greater than a certain limiting value and no regulator is active. In this case, the wheel brake pressure is then equal to the measured admission pressure.

FIG. 3 shows a flow chart illustrating one possibility for analyzing the brake characteristic value as a computer program. According to this, after the program starts in first step 200, the brake setpoint values determined are input for individual wheel brakes MSOLLXY. In the next step 202, a corresponding brake pressure setpoint PSOLLXY is determined from the corresponding setpoint torque variable, taking into account adapted brake characteristic values CPXY. Then in step 204, by using the hydraulic model known from the related art cited in the preamble, triggering times TXY for the valve arrangements are determined for each individual wheel brake on the basis of the setpoint pressure thus determined and the estimated or measured actual brake pressure.

By using the corresponding variables, the procedure described above is also used with pneumatic wheel brakes or brakes using an electric motor for application of braking force. Instead of the brake pressure, an electric current quantity is then used, for example, because this represents the control variable triggering the application of braking force.

What is claimed is:

1. A method of determining a characteristic value of a wheel brake, the characteristic value representing a relationship between one of a braking torque and a braking force and a control variable of the wheel brake which triggers an application of the one of the braking torque and braking force by the wheel brake, the method comprising:
    determining the characteristic value as a function of operating variables, and for each wheel individually as a function of a wheel-specific variable,
    wherein the characteristic value is determined only when no regulator intervention measure is implemented and a driver is braking.

2. The method of claim 1, wherein the control variable is one of a brake pressure and a triggering variable of the wheel brake when actuated by an electric motor.

3. The method of claim 1, further comprising:
    filtering the characteristic value.

4. The method of claim 1, further comprising:
    using the characteristic value to one of determine a setpoint brake pressure from a setpoint braking torque, determine a wheel brake pressure from one of a measured braking force and a measured braking torque, and estimate wheel performance.

5. The method of claim 1, wherein the characteristic values are adapted based on the operating variables for a respective driving situation.

6. A method of determining a characteristic value of a wheel brake, the characteristic value representing a relationship between one of a braking torque and a braking force and a control variable of the wheel brake which triggers an application of the one of the braking torque and braking force by the wheel brake, the method comprising:
    determining the characteristic value as a function of operating variables, and for each wheel individually as a function of a wheel-specific variable, wherein the wheel-specific variables include at least one of wheel slip, tire contact force, wheel brake pressure, and wheel radius, and wherein the characteristic value is determined only when no regulator intervention measure is implemented and a driver is braking.

7. The method of claim 6, wherein the characteristic values are adapted based on the operating variables for a respective driving situation.

8. A method of determining a characteristic value of a wheel brake, the characteristic value representing a relationship between one of a braking torque and a braking force and a control variable of the wheel brake which triggers an application of the one of the braking torque and braking force by the wheel brake, the method comprising:

determining the characteristic value as a function of operating variables, and for each wheel individually as a function of a wheel-specific variable; and analyzing an engine torque acting on a driven wheel, wherein the characteristic value is determined only when no regulator intervention measure is implemented and a driver is braking.

9. The method of claim 8, wherein the characteristic values are adapted based on the operating variables for a respective driving situation.

10. A method of determining a characteristic value of a wheel brake, the characteristic value representing a relationship between one of a braking torque and a braking force and a control variable of the wheel brake which triggers an application of the one of the braking torque and braking force by the wheel brake, the method comprising:

determining the characteristic value as a function of operating variables, and for each wheel individually as a function of a wheel-specific variable, wherein a change in the characteristic value occurs only in a predetermined operating state, so that outside the predetermined operating state, a determined characteristic value is retained, and wherein the characteristic value is determined only when no regulator intervention measure is implemented and a driver is braking.

11. The method of claim 10, wherein the characteristic values are adapted based on the operating variables for a respective driving situation.

12. A method of determining a characteristic value of a wheel brake, the characteristic value representing a relationship between one of a braking torque and a braking force and a control variable of the wheel brake which triggers an application of the one of the braking torque and braking force by the wheel brake, the method comprising:

determining the characteristic value as a function of operating variables, and for each wheel individually as a function of a wheel-specific variable, wherein the characteristic value of CP is defined by the following equation: $CP=(\ddot{y}*FN*RRAD*CLAM)/PRAD+MMOT/PRAD$.

13. The method of claim 12, wherein the characteristic values are adapted based on the operating variables for a respective driving situation.

14. A device for determining a characteristic value of a wheel brake, the device comprising:

a control arrangement to implement at least one control function by analyzing the characteristic value of a wheel brake which represents a relationship between one of a braking torque and a braking force and a control variable which triggers an application of the braking force, the control arrangement being configured to determine the characteristic value individually for each wheel based on a wheel-specific variable, wherein the control arrangement is configured to determine the characteristic value only when no regulator intervention measure is implemented and a driver is braking.

15. The device of claim 14, wherein the characteristic values are adapted based on the operating variables for a respective driving situation.

* * * * *

UNITED STATES PATENT AND TRADEMARK OFFICE
CERTIFICATE OF CORRECTION

| | |
|---|---|
| PATENT NO. | : 7,062,369 B2 |
| APPLICATION NO. | : 10/221089 |
| DATED | : June 13, 2006 |
| INVENTOR(S) | : Thomas Rader et al. |

It is certified that error appears in the above-identified patent and that said Letters Patent is hereby corrected as shown below:

On the face of the patent, (57) ABSTRACT, line 2 change "of a wheel brake are described" to --of a wheel brake.--

On the face of the patent, (57) ABSTRACT, line 3 change "which representing" to --which represents--

Column 1, line 5, change "BACKGROUND INFORMATION" to --FIELD OF THE INVENTION--

Column 1, line 8, insert heading --"BACKGROUND INFORMATION"--

Column 1, line 14, delete "the known"--

Column 1, line 20, delete "there"--

Column 1, line 31, change "The same thing also applies" to --This similarly applies--

Column 1, line 36-37, change "German Patent Application" to --German Published Patent Application No.--

Column 1, line 37, delete "A1"--

Column 1, line 39, change "It has been found" to --It has been determined--

Column 1, line 42, change "for the change" to --for the variation--

Column 1, line: 43, change "circumstances result" to --factors result--

Column 1, line 47-48, change "this would result in inaccuracies" to --inaccuracies would result--

Column 1, line 50, change "values or it would result" to --values. This may also result--

UNITED STATES PATENT AND TRADEMARK OFFICE
CERTIFICATE OF CORRECTION

PATENT NO. : 7,062,369 B2
APPLICATION NO. : 10/221089
DATED : June 13, 2006
INVENTOR(S) : Thomas Rader et al.

It is certified that error appears in the above-identified patent and that said Letters Patent is hereby corrected as shown below:

Column 1, lines 52, change "German Patent Application 196 48 936 A1" to --German Published Patent Application No. 196 48 936--

Column 1, line 53, change "with the help of which" to --where--

Column 1, line 57, delete "there"--

Column 1, line 60, change "values may be determined" to --values are determined--

Column 1, line 63, change "ADVANTAGES OF THE INVENTION" to --SUMMARY OF THE INVENTION--

Column 2, line 7, remove "It is especially advantageous that the" to --The --and change "parameter is" to --parameter may be --

Column 2, line 9, change "change are" to --changes may be--

Column 2, line 12-13, delete "Additional advantages are derived from the following description and the dependent patent claims."--

Column 2, line 15, change "DRAWING" to --BRIEF DESCRIPTION OF THE DRAWINGS--

Column 2, line 19, change "FIG. 1 shows" to --FIG. 1 is--

Column 2, line 21, change "FIGS. 2 and 3 show flow charts" to --FIG. 2 is a flow chart --and change "a preferred" to --an exemplary--

Column 2, line 24, insert new paragraph "FIG. 3 is a flow chart illustrating an exemplary embodiment for determination and analysis of the brake parameter."--

Column 2, line 25, change "DESCRIPTION OF THE EXEMPLARY EMBODIMENTS" to --DETAILED DESCRIPTION--

UNITED STATES PATENT AND TRADEMARK OFFICE
CERTIFICATE OF CORRECTION

| | | |
|---|---|---|
| PATENT NO. | : 7,062,369 B2 | |
| APPLICATION NO. | : 10/221089 | |
| DATED | : June 13, 2006 | |
| INVENTOR(S) | : Thomas Rader et al. | |

It is certified that error appears in the above-identified patent and that said Letters Patent is hereby corrected as shown below:

Column 2, line 28, change "FIG 1 shows" to --FIG 1 illustrates--

Column 2, line 34, change "FIG 1 shows" to --FIG 1 illustrates--

Column 2, line 35, change "example input" to --example, input--

Column 2, line 46-47, delete "are mentioned in the related art cited in the preamble, for example, and"

Column 2, line 51, change "Examples of the" to --The-- and change "functions executed" to --functions may be executed--

Column 2, line 52, change "microcomputer 14" to --microcomputer 14.--

Column 2, line 53, delete "are known from the related art cited in the preamble."--

Column 2, line 65, change "the design of" to --the configuration of--

Column 3, line 7, change "on the basis of this" to --with this--

Column 3, line 8, change "It has been found that during" to --During--

Column 3, line 10, delete "it is possible to estimate"-- and change "friction on the" to --friction of the--

Column 3, line 11, change "and thus to estimate" to --may be estimated and thus--

Column 3, line 12, change "the brake parameter." to --the brake parameter may be estimated.--

Column 3, line 14, change "this case" to --this instance--

Column 3, line 30, change "has proven suitable:" to --may be used:--

Column 3, line 35, change "prevails under which" to --exists where--

Column 3, line 49, change "the preferred" to --another exemplary--

UNITED STATES PATENT AND TRADEMARK OFFICE
CERTIFICATE OF CORRECTION

PATENT NO.         : 7,062,369 B2
APPLICATION NO. : 10/221089
DATED               : June 13, 2006
INVENTOR(S)       : Thomas Rader et al.

It is certified that error appears in the above-identified patent and that said Letters Patent is hereby corrected as shown below:

Column 3, line 50, change "is implemented" to --may be implemented--

Column 3, line 66, change "If step 102 has shown" to --If it is determined in step 102--

Column 4, line 9, change "FIG 3 shows" to --FIG 3 is--

Column 4, line 17, change "the hydraulic model" to --a hydraulic model--

Column 4, line 18, delete "known from the related art cited in the preamble,"

Signed and Sealed this

Ninth Day of January, 2007

JON W. DUDAS
*Director of the United States Patent and Trademark Office*